July 12, 1949.  R. C. HOWELL  2,475,963
MOTOR TRUCK CRANE
Filed Dec. 6, 1943  6 Sheets-Sheet 1
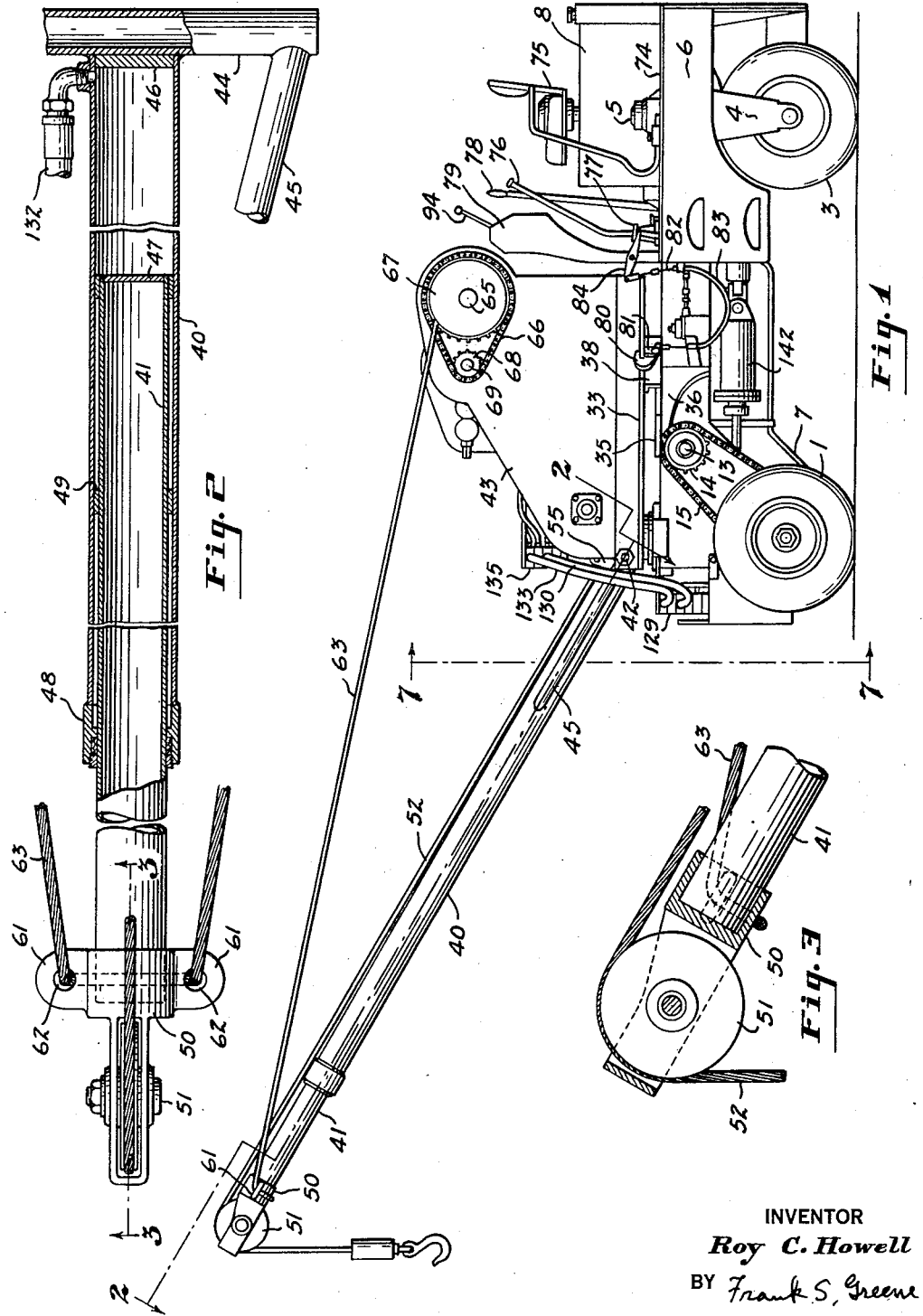
INVENTOR
*Roy C. Howell*
BY *Frank S. Greene*
ATTORNEY July 12, 1949.  R. C. HOWELL  2,475,963
MOTOR TRUCK CRANE
Filed Dec. 6, 1943  6 Sheets-Sheet 2
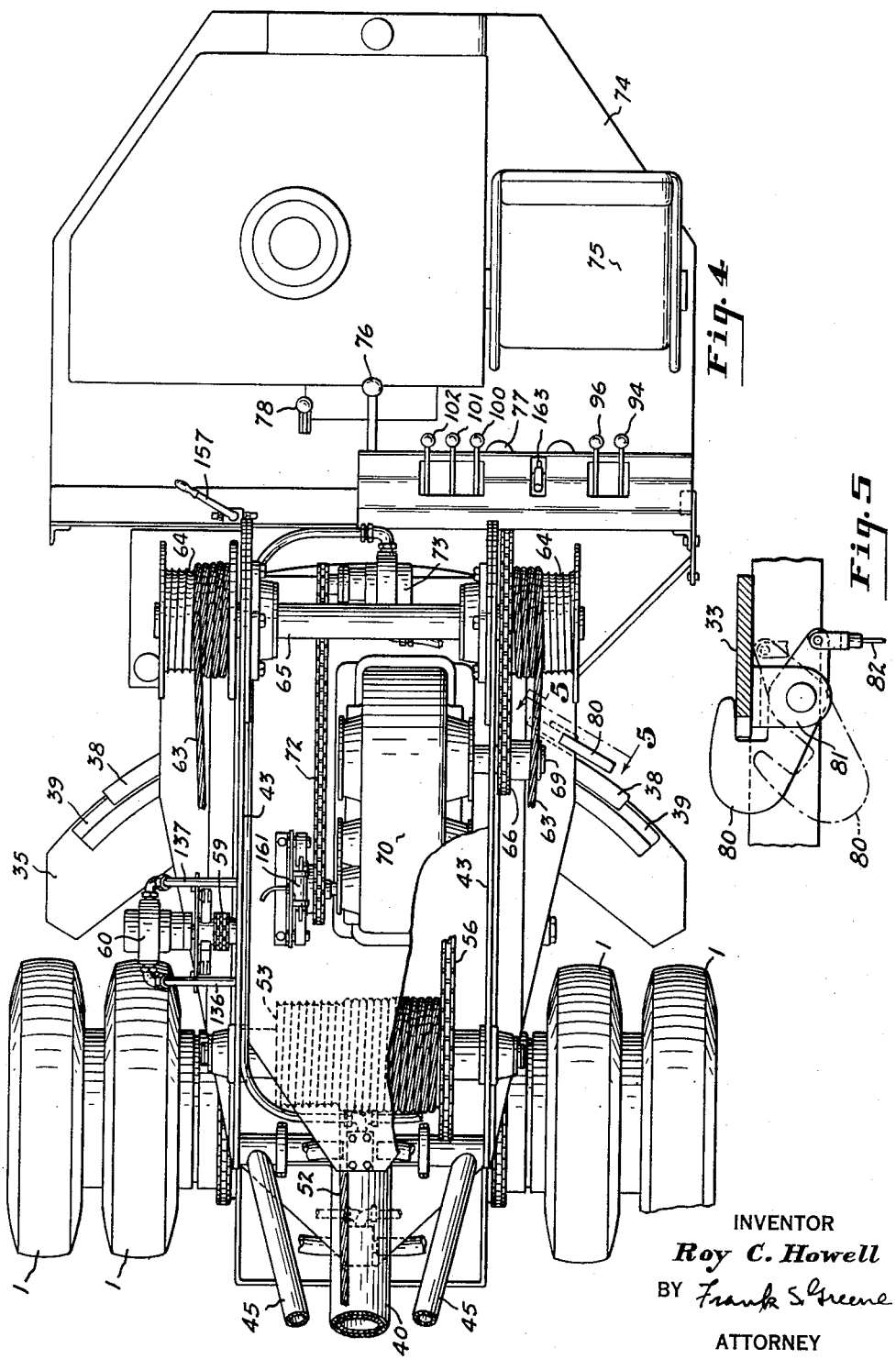
INVENTOR
*Roy C. Howell*
BY *Frank S. Greene*
ATTORNEY

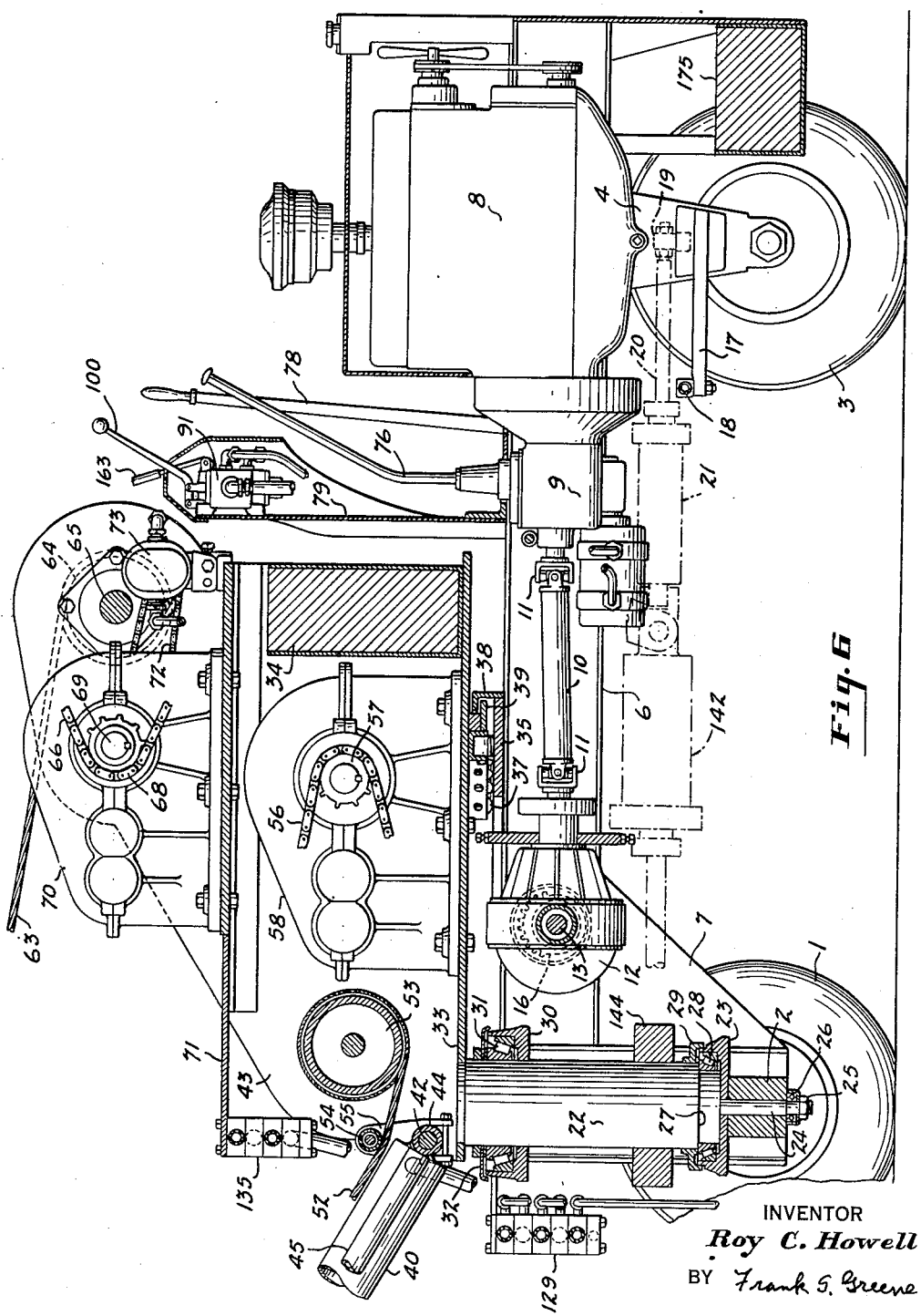

July 12, 1949.  R. C. HOWELL  2,475,963
MOTOR TRUCK CRANE

Filed Dec. 6, 1943  6 Sheets-Sheet 4

INVENTOR
*Roy C. Howell*
BY *Frank S. Greene*
ATTORNEY

July 12, 1949.    R. C. HOWELL    2,475,963
MOTOR TRUCK CRANE
Filed Dec. 6, 1943    6 Sheets-Sheet 5
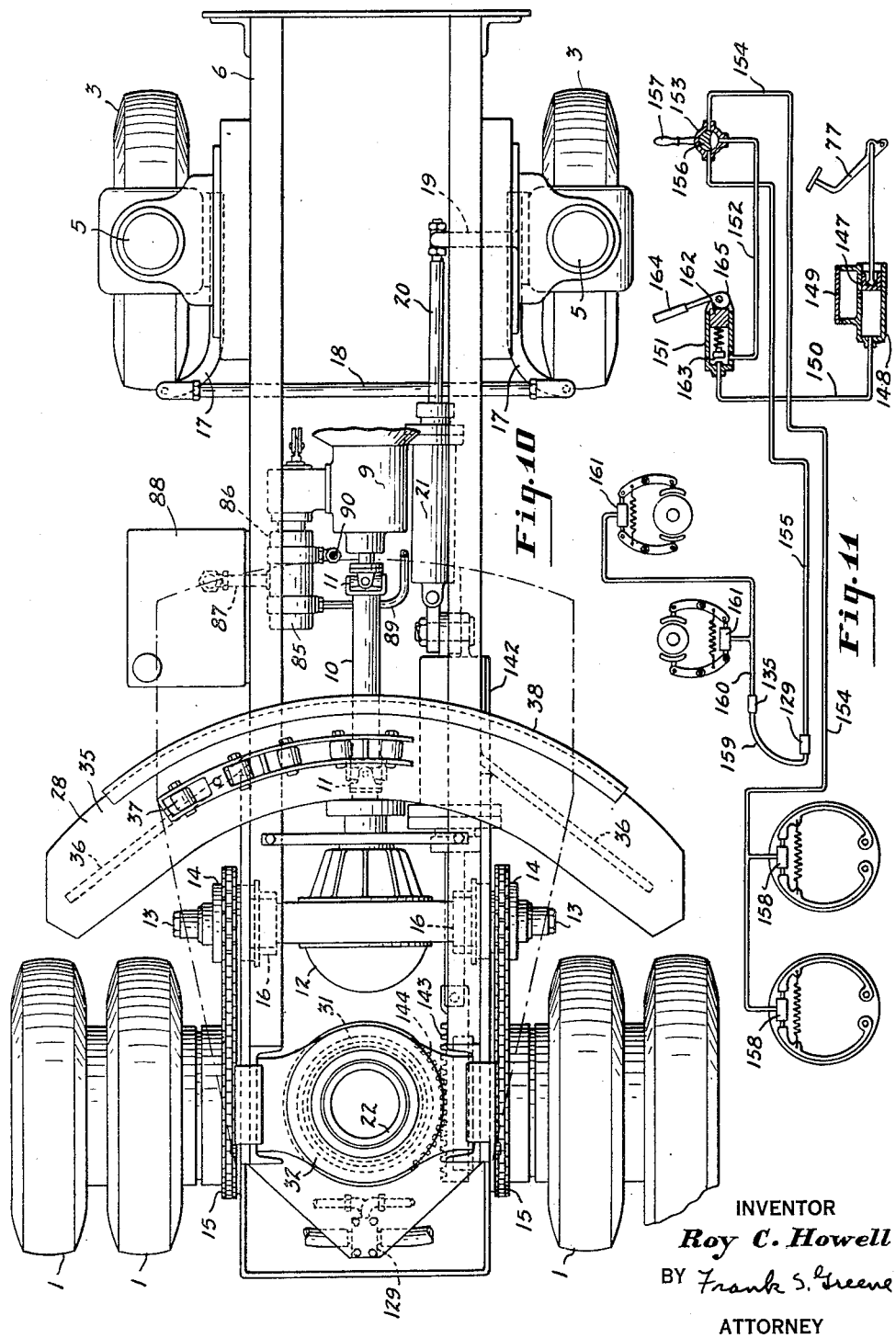
INVENTOR
*Roy C. Howell*
BY *Frank S. Greene*
ATTORNEY

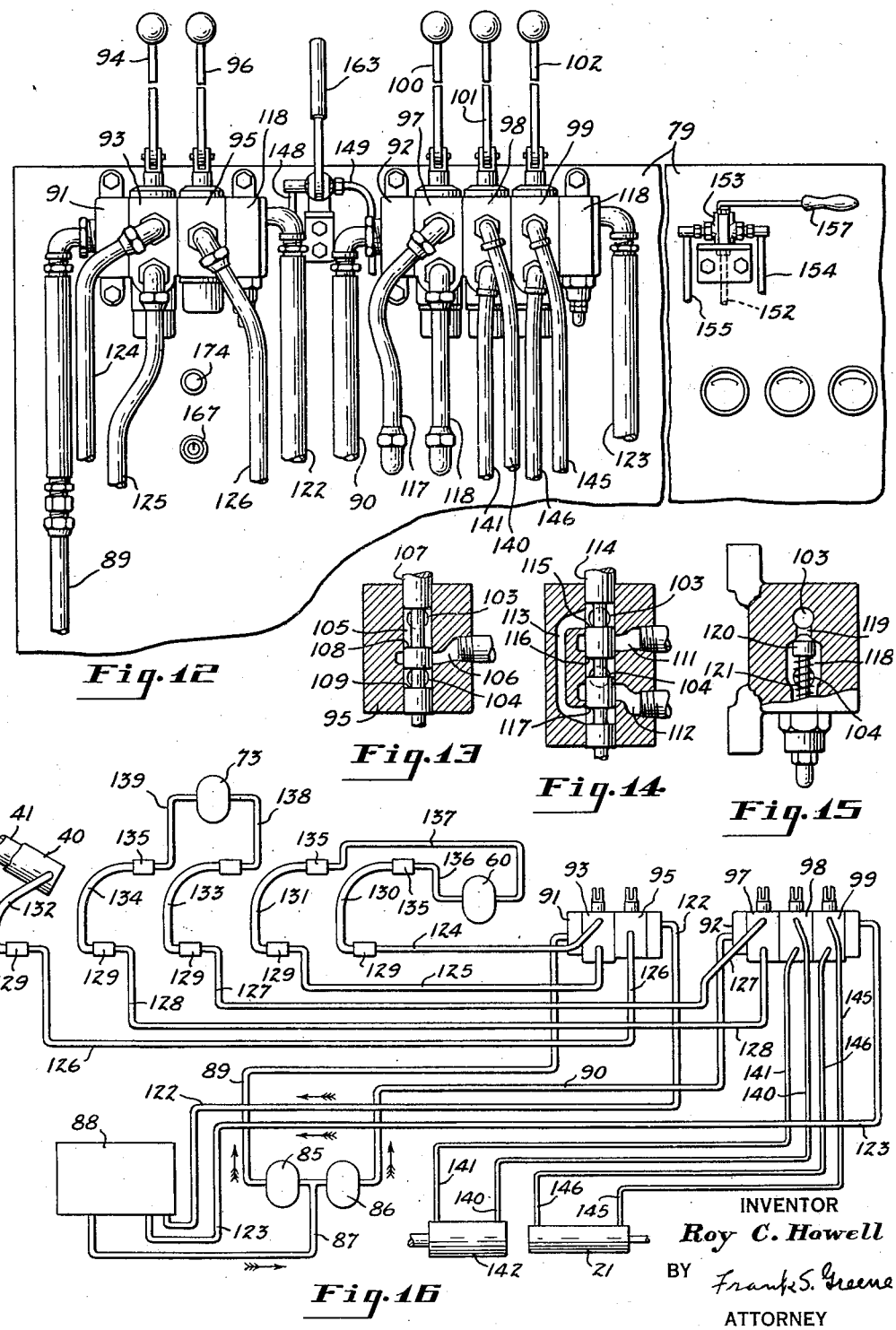

Patented July 12, 1949

2,475,963

UNITED STATES PATENT OFFICE 2,475,963

MOTOR TRUCK CRANE

Roy C. Howell, Cleveland, Ohio

Application December 6, 1943, Serial No. 513,204

2 Claims. (Cl. 212—59)

This invention relates to motor truck cranes and has for an object to provide a motor truck crane which has a relatively long extensible boom that is mounted to swing vertically and laterally and which is so mounted upon the truck that relatively heavy loads at a considerable distance from the truck may be handled without overbalancing the truck.

It is an object of the invention to provide a truck of the character referred to in which the load hoisting, boom hoisting, boom sluing and boom extending mechanisms are all powered from the truck engine and are all controlled by manually operable elements conveniently accessible to the driver of the truck.

A further object of the invention is to provide a compact and convenient grouping of the motor vehicle and hoist control elements between the driver's seat and the boom carrying frame.

Other objects of the invention are to provide a boom of telescopic tubing which possesses adequate strength but which is very light weight whereby little power is expended in swinging the boom and to provide a boom which can be quickly assembled or dismantled.

An additional object is to provide pressure creating means and controls for the hydraulically operated load handling mechanisms which will permit certain of the hydraulic mechanisms to be operated simultaneously.

It is also an object of this invention to provide a system of conduits for conducting liquids under pressure from the truck frame to hydraulically operated mechanisms on the boom carrying frame, the said conduits including flexible sections connecting headers on the truck and boom supporting frame, the headers being so positioned as to have only slight relative movements during sluing of the boom supporting frame.

With the above and other objects in view the invention may be said to comprise the truck crane as illustrated in the accompanying drawings hereinafter described and particularly set forth in the appended claims together with such variation and modification thereof which will be apparent to one skilled in the art to which the invention pertains.

Reference should be had to the accompanying drawings forming a part of the specification in which:

Fig. 1 is a side elevation of a motor truck crane embodying the invention;

Fig. 2 is a longitudinal section through the boom, taken on the line indicated at 2—2 in Fig. 1;

Fig. 3 is a section taken on the line indicated at 3—3 in Fig. 2;

Fig. 4 is a top plan view of the truck with a portion of the top deck of the boom carrying frame broken away to show the underlying load hoisting drum;

Fig. 5 is a detailed view showing the latch for locking the boom carrying frame during travel of the truck;

Fig. 6 is a longitudinal section taken on the line indicated at 6—6 in Fig. 4;

Fig. 10 is a top plan view of the truck chassis;

Fig. 11 is a diagrammatic view showing the hydraulic brake system;

Fig. 12 is a front elevation of the control panel and the controlling units thereon for the hydraulic mechanisms employed in the operation of the crane and truck;

Fig. 13 is a sectional view showing a single outlet control valve;

Fig. 14 is a sectional view showing a double outlet control valve;

Fig. 15 is a sectional view showing the pressure regulating valve employed in each of the valve assemblies;

Fig. 16 is a diagrammatic view showing the hydraulic system for operating the crane and the vehicle steering mechanism.

Figure 7:
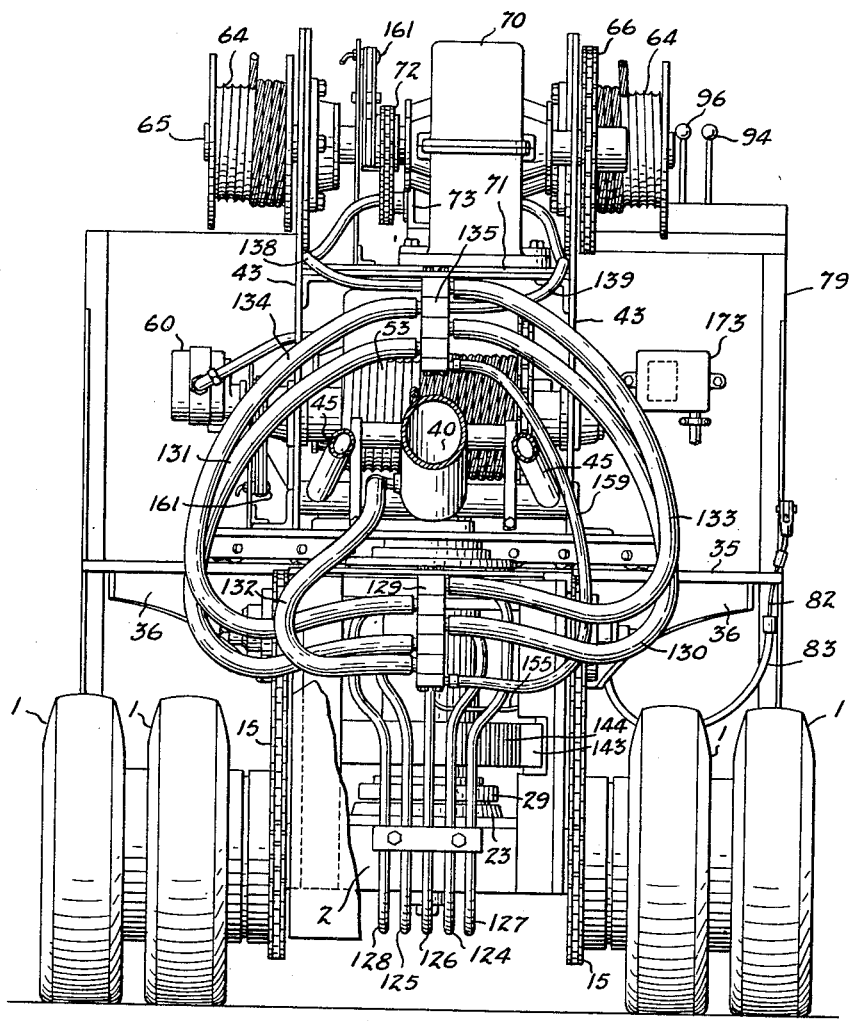
Fig. 7 is a sectional view taken as indicated at 7—7 in Fig. 1 and showing the truck and boom carrying frame in front elevation.

The crane carrying truck of the present invention has a pair of wheels 1 at each end of a front axle 2 and rear wheels 3 that are mounted in individual forks 4 that have vertical spindles 5 journaled in the truck frame 6. The frame 6 has a downwardly extending front portion 7 that is attached to the axle 2 and an engine 8 is supported at the rear end of the frame 6 between the wheels 3. The engine 8, as best shown in Figs. 6 and 10, is geared through a suitable transmission in a housing 9 to a longitudinal transmission shaft 10, provided with universal couplings 11 connecting it to shafts projecting from the housing 9 and from a differential housing 12 adjacent the forward end of the frame.

The differential gearing within the housing 12 drives jack shafts 13 which carry sprockets 14 which have sprocket chains 15 that drive the wheels 1. The differential housing 12 may be mounted on eccentric bearings 16 which are adjustable to raise or lower the housing so as to apply the proper tension to the sprocket chains 15.

The wheel supporting forks 4 have forwardly extending outwardly curved arms 17 rigidly attached thereto, the forward ends of which are pivoted to a transverse connecting rod 18 through which the rear wheels 3 are caused to turn simultaneously. One of the forks 4 has an inwardly extending arm 19 which is connected to a piston 20 of a hydraulic cylinder 21 by means of which angular movements are imparted to the rear wheels 3 to steer the vehicle.

As best shown in Fig. 6 a crane pivot post 22, which may be a tubular metal post, is rotatably mounted in the frame directly above the center of the front axle 2. The lower end of the pivot post is seated in a bearing cup 23 mounted on the axle 2. The cup 23 is positioned on the axle 2 and the post 22 is secured in fixed position with respect to the axle by means of a stud 24 rigidly connected to and extending axially from the lower end of the post 22 through the axle 2. A nut on the lower end of the stud 24 clamps a ball bearing 26 against the under face of the axle 22.

The post 22 has a reduced lower end which provides a shoulder 27 that rests upon the inner race of a roller thrust bearing 28 mounted in the cap 23 and immediately above the bearing 28. The post carries a cover ring 29 that prevents entry of water and dirt to the roller bearing 28. The post 22 is journaled near its upper end in a cross member 30 at the front end of the truck frame 6 and within the cross member 30 there is mounted a second thrust roller bearing 31, a cover plate 32 being provided for the bearing 31. The post 22 projects a short distance above the bearing 28 and has rigidly attached thereto a plate 33 which forms the bottom deck of a boom supporting frame. The plate 33 extends rearwardly from the post 22 and carries a counter-weight 34 at its rear end. An arcuate transverse track member 35 is mounted on top of the truck frame 6 rearwardly of the front wheels 1 and provides a support for the boom carrying frame rearwardly of the post 22. The track member 35 is supported upon the side members of the frame 6 and upon brackets 36 attached to the side members and projecting outwardly therefrom. An arcuate row of rollers 37 are mounted to the underside of the plate 33 and are adapted to travel on the track 35.

As best shown in Fig. 6 an angle bar retainer 38 is attached to the arcuate rear edge of the track member 35 with its flange projecting forwardly above the track member and an arcuate guide plate 39 attached to the underside of the plate 33 underlies the flange of the retainer bar 38 to limit the movement of the rear end of the boom carrying frame with respect to the truck frame.

As shown in Fig. 2 the boom has a tubular inner section 40 and a tubular outer section 41 that is telescopically received in the section 40. Adjacent its forward end the boom carrying frame has a detachable horizontal shaft 42 that is mounted at its ends in side walls 43 of the boom carrying frame. A sleeve 44 disposed at right angles to the inner section 40 of the boom and welded to the inner end of the section 40 is adapted to receive the shaft 42 and provides an elongated pivot bearing for the vertically swinging boom. The ends of the sleeve 44 bear against the side walls 43 of the frame and the boom is braced by tubes 45 that are welded to the ends of the sleeve 44 and to the inner section 40 of the boom.

A disc 46 seals the inner end of the tubular inner section 40 of the boom and a disc 47 seals the inner end of the outer section 41 so that a chamber is provided between the discs 46 and 47 that is adapted to receive fluid under pressure to extend the boom. A packing gland 48 seals the outer end of the space between the tubular sections 40 and 41 at the outer end of the section 40 and bearing rings 49 on the section 41 have a sliding fit within the tubular section 40 providing spaced bearings for the slidable section 41 and serving to limit the outward movement of the section 41.

On the outer end of the tubular section 41 there is mounted a detachable cap 50 that is adapted to fit upon the outer end of the tube 41, the cap 50 carrying a sheave 51 over which a load hoist cable 52 runs, the cable 52 extending parallel with the boom to a winding drum 53 on the boom supporting frame adjacent the inner end of the boom. The winding drum 53 is mounted in the bottom deck 33 of the boom carrying frame near its forward end. The cable 52 is guided by a roller 54 that is carried by brackets 55 that are pivotally anchored to the sleeve 44. The connection between the brackets 55 and the sleeve 44 permitting the brackets to swing and the length of the brackets being such as to position the guide roller 54 above and close to the inner end of the boom. As best shown in Figs. 4 and 6 the drum 53 is driven by a sprocket chain 56 which is driven by a sprocket 57 driven through suitable reduction gearing in a housing 58, the gearing in the housing 58 being driven by a sprocket chain 59 that is operated by a hydraulic motor 60 mounted on the boom carrying frame.

The sheave carrying cap 50 is provided with laterally projecting flanges 61 that are provided with holes 62 through which a boom hoist cable 63 is threaded. The cable extends across the under side of the cap 50 and through the holes 62, the ends of the hoist cable 63 being attached to winding drum 64 that are mounted at opposite ends of a transverse shaft 65 journaled in the side walls 43 of the boom carrying frame. The shaft 65 is driven by a sprocket chain 66 which runs over a sprocket 67 on the shaft 65 and over a sprocket 68 on a shaft 69 which extends from a reduction gear housing 70 mounted on a plate 71 that forms the upper deck of the boom carrying frame. The gearing in the reduction housing 70 is driven through a sprocket chain 72 from a hydraulic motor 73 mounted upon the upper deck 71 adjacent its rear end.

The cap 50 is held in place on the end of the boom section 41 by the hoist cable 63 which exerts an end thrust on the cap 50 and boom section 41. The boom can be quickly and easily assembled by attaching the section 40 to the boom carrying frame by means of the detachable shaft 42, inserting the section 41 in the section 40 and applying the cap 50.

As shown in Figures 1 and 4 the truck frame has a rear platform 74 alongside the engine 8 and on this platform is mounted a driver's seat 75. On the platform 74 in front of the driver's seat there are mounted the usual drive control pedals and levers including a gear shift lever 76 and a brake pedal 77. A pump control lever 78 is also mounted at one side of the drive control elements, the lever 78 being employed to connect hydraulic pressure generating pumps with the truck driving mechanism or to disconnect the same. In front of the driver's seat there is also mounted a control panel 79 upon which the usual motor vehicle gauges and indicators are mounted together with control elements for the hydraulic mechanisms which will be hereinafter described.

To securely hold the boom carrying frame to the truck frame during travel of the truck, a latch 80 (see Figs. 1 and 5) is provided which is pivoted on a bracket 81 attached to the retainer bar 38 and which is adapted to hook over a side edge of the bottom plate 33 to secure the same against movement with respect to the top of the truck frame. The latch 80 is operated by means of a chain 82 which extends through a flexible conduit 83 to a pedal lever 84 pivoted to the frame at the end of the panel 79 adjacent the driver's seat. When the boom carrying frame is positioned parallel to the truck frame as shown in Fig. 4, the hook 81 may be swung to locking position by depressing the pedal 84.

The hydraulic drum operating motors 60 and 73 the boom extending cylinder, together with boom sluing and vehicle steering devices are parts of a hydraulic system under the control of the driver of the truck and this hydraulic system is shown diagrammatically in Fig. 16 of the drawings, the specific location of the various parts shown in Fig. 16 being shown in other figures of the drawing. Two pumps 85 and 86 are mounted as shown in Fig. 10 adjacent the truck transmission housing 9 and are adapted to be driven from the vehicle transmission under the control of the lever 78. The inlets of the two pumps 85 and 86 are connected by pipe 87 to a liquid reservoir 88 mounted on the truck frame alongside the pumps, and the outlets of the pumps 85 and 86 are connected by pipes 89 and 90, to the inlet ends of two valve assemblies 91 and 92 mounted on the panel 79, the valve assembly 91 being utilized to control the extension of the boom and the operation of the load hoist winding drum, the valve assembly 92 being utilized to control the boom hoist mechanism, the boom sluing mechanism and the vehicle steering mechanism.

The assembly 91 has a double outlet valve unit 93 controlled by a lever 94 and a single outlet valve unit 95 controlled by a lever 96. The valve assembly 92 has three double outlet valve units 97, 98, and 99 that are controlled by levers 100, 101 and 102. The double outlet valve units 93, 97, 98 and 99 are identical and one of these units is illustrated in Fig. 14. The single valve unit 95 is illustrated in Fig. 13 and the pressure control valve of each of the two valve assemblies 91 and 92 is illustrated in Fig. 15. The valve assemblies, each have an upper passage 103 that communicates with the inlet pipes 89 and 90 and a lower exhaust passage 104.

The valve unit 95 has a vertical bore 105 that intersects the passage 103 and 104 and is provided with a lateral port 106 between the passages 103 and 104. A spool valve 107 is mounted in the bore 105 and is provided with spaced circumferential grooves 108 and 109. In the intermediate position of the valve shown in Fig. 13, the outlet port 106 is closed and the two grooves 108 and 109 register with the passages 103 and 104 to permit liquid to flow freely through the valve unit. When the valve is moved downwardly from the position shown in Fig. 13, communication is established between the pressure passage 103 and the outlet port 106 and when the valve is moved upwardly from the position shown, the port 106 is placed in communication with the exhaust passage 104.

Each of the double outlet valve units has a vertical bore 110 that intersects the passages 103 and 104 and is provided with a lateral port 111 between the passages 103 and 104 and a lateral port 112 below the passage 104. A by-pass 113 is provided from the portion of the bore alongside the passage 103 to a portion of the bore below the port 112. A spool valve 114 is mounted for vertical movement in the bore 110 and has three spaced circumferential grooves 115, 116 and 117. The valve 114, when in the neutral position shown in Fig. 14, closes the outlets 111 and 112 and has its grooves 115 and 116 in alinement with the pressure and exhaust passages 103 and 104 to permit free flow past the valve. When the valve 114 is moved downwardly from the neutral position shown, the upper lateral port 111 is placed in communication with the pressure passage 103 and the lower lateral port 112 is placed in communication with the exhaust passage 104. When the exhaust passage 104 is moved upwardly from the position shown the lateral port 111 is placed in communication with the exhaust passage 104 and lower lateral port 112 is placed in communication through the by-pass 113 with the pressure passage 103.

At the outlet end of each of the valve assemblies 91 and 92 there is provided a valve chamber 118 which as shown in Fig. 15 is connected by a port 119 to the pressure passage 103. The chamber 118 of the valve assembly 91 communicates with the exhaust passage 104 and with a return pipe 112 and the chamber 118 of the valve assembly communicates with a return pipe 123, the pipes 112 and 123 extending to the reservoir 88. A valve 120 within the chamber 118 is pressed against the port 119 by a spring 121. The pressure of the spring 121 which is adjustable by suitable means determines the pressure necessary to open the valve 120 and this serves to limit the pressure in the hydraulic system.

Pipes 124 and 125 extend from the ports 111 and 112 of the valve unit 93, pipe 126 extends from the port 106 of the valve unit 95 and pipes 127 and 128 extend from the ports 111 and 112 of the valve unit 97. The pipes 124 and 128 all extend to a header 129 at the forward end of the truck frame that is preferably positioned immediately in front of the pivot post 22. Flexible tubes 130, 131, 132, 133 and 134 are connected through the header 129 to the pipes 124 to 128 inclusive and pipes 130, 131, 133 and 134 are connected to a header 135 which is positioned vertically on the boom carrying frame above the pivot post 22 and closely adjacent the pivotal axis of the frame. Since the header 135 is disposed vertically and positioned close to the vertical axis of the boom carrying frame, this header moves only a short distance upon sluing movements of the boom so that relatively short flexible tube sections may be employed between the headers 129 and 135. These tubes are bowed outwardly to pass the inner end of the boom and alternate tubes are preferably positioned on opposite sides of the boom. The flexible tube 132 is connected to the inner section 40 of the boom to deliver fluid under pressure to the interior of the tubular boom to extend the boom.

Pipes 136 and 137 connect the flexible sections 130 and 131 through the header 135 to the hydraulic motor 60. Pipes 138 and 139 connect the flexible sections 133 and 134 through the header 135 to the hydraulic motor 73. Pipes 140 and 141 connect the valve unit 98 to a sluing cylinder 142 that operates a rack 143, that meshes with a segmental gear 144 fixed to the pivot post 22. The double outlet valve unit provides means for reversing the flow through both pipes to positively actuate the piston of cylinder 142 in either direction to swing the boom to the right or to the left.

The pipes 145 and 146 connect the valve unit 99 to the steering cylinder 21. By shifting the lever 102 forwardly or rearwardly from its neutral position the piston rod 20 may be moved forwardly or rearwardly from the position shown in Fig. 10 to turn the wheels 3 to the right or to the left.

As shown in Fig. 11, the brake pedal 77 operates a piston 147 in a cylinder 148. The cylinder 148 receives liquid from a reservoir 149 through a lateral port and the piston 147 when actuated by the pedal 77 forces liquid under pressure through a pipe 150 to a cylinder 151 and through the cylinder 151 and a pipe 152 to a valve casing 153 through which the liquid may be delivered into either of two pipes 154 and 155.

A two way valve 156 in the casing 153 is movable by means of a handle 157 from a neutral position to a position placing the pipe 152 in communication with the pipe 154 or to a position connecting the pipe 152 to the pipe 155. The pipe 154 extends to hydraulic brakes 158 on the wheels 1 and, during propulsion of the motor truck the valve 156 is set to deliver pressure to the pipe 154. The pipe 155 extends to the header 129 at the forward end of the truck frame and a flexible conduit 159 connects with the pipe 155 through the header 129 and with a pipe 160 through the header 135 on the boom carrying frame. The pipe 160 is connected to hydraulic brakes 161 on the shafts of the motors 60 and 73 that drive the load hoist drum 53 and the boom hoist drum 65. During hoisting operations the valve 156 is positioned to deliver pressure to the drum brakes. If pressure is being applied to the vehicle or drum brakes when the valve 156 is shifted, the pressure will be retained in such brakes after the valve is shifted. Thus the wheel brakes may be set while the hoisting devices are being operated and the winding drum brakes may be set while the truck is being driven. If pressure be maintained in the cylinders 148 and 151 and pipe 152 while the lever 157 has been shifted to one extreme position to deliver pressure to the wheel brakes, then to the other extreme position to deliver pressure to the drum brakes, and then to neutral position both the wheel brakes and the drum brakes may be locked.

An increased pressure may be obtained in the lines leading to either the wheel brakes or the drum brakes by means of a piston 162 in the cylinder 151. The piston 162 is normally held in retracted position by fluid pressure and carries a yieldably mounted valve 163 adapted to close the port through which the pipe 150 delivers into the cylinder 151. The piston 162 may be actuated to apply an increased pressure to the liquid in the system by means of a lever 164 having a cam 165 bearing against the piston 162. Pressure may be applied by the lever 164 independently of the pedal 77 or the lever 164 may be actuated while the pedal 77 is depressed to hold the pressure and to apply additional pressure.

Figures 8, 9:
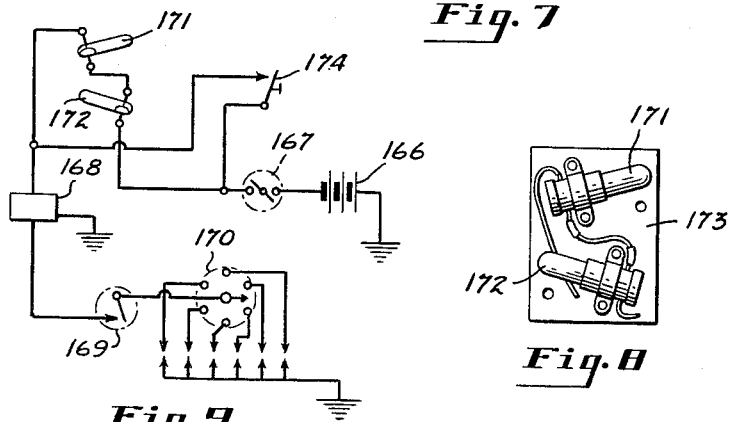
Fig. 8 is a front elevation of a mercury switch that is controlled by the tilting of the vehicle frame.
Fig. 9 is a wiring diagram of the truck engine ignition system showing the automatically operated mercury switches and the manually operable emergency switch.

In Fig. 9 of the drawing an engine ignition circuit is shown that has the usual battery 166, key switch 167, coil 168, circuit breaker 169 and timer 170. This circuit has two gravity controlled switches in the form of oppositely inclined mercury switches 171 and 172 therein that are carried by a housing 173 attached to the panel 79. One of the two switches acting to break the circuit upon the tilting of the truck frame to an angle great enough to cause the mercury of the switch to flow away from the contacts. When the truck frame tilts in either direction sufficiently to open one of the switches 171 or 172, the ignition circuit is rendered inoperative, and the engine ceases to apply power to the truck wheels or to the load manipulating devices. After the ignition circuit has been broken by the operation of one of the safety switches 171 or 172 the circuit may be closed by means of an emergency switch 174 in parallel with the switches 171 and 172, so that the operator may operate the load handling mechanisms as may be desirable to shift the load to a position opposed to further tilting and so that the vehicle may be propelled while the switch 174 is being held closed. When the vehicle frame is restored to a nearly level position the switches 171 and 172 will be closed and the emergency switch 174 may be released.

The load carried by the hoist cable 52 is counterbalanced by the hoisting mechanisms and the counterweight 34 mounted upon the boom carrying frame, and by the motor truck frame, rear wheels and engine. An additional counterweight 175 may be mounted at the rear end of the truck frame as shown in Fig. 6. The front wheels 1 provide a wide support for the crane so that the boom may swing laterally through a considerable angle without overbalancing the truck. The boom being of light weight and having a stable support may be made quite long so that loads may be shifted through a considerable range toward and away from the truck.

By providing two separate pumps and valve assemblies for controlling the hydraulic mechanisms simultaneous operation of certain of the mechanisms is possible. For example the boom hoist and load hoist drums may be simultaneously operated to move the load toward or away from the truck while holding the load at a substantially fixed elevation. Also the load hoist may be operated if desired while the boom is being slued or the boom may be shortened or lengthened while it is being raised, lowered or slued.

The brake control mechanism permits the truck wheel brakes to be set while loads are being manipulated, the hoisting drums to be locked while the truck is being propelled and all of the brakes to be locked when desired, additional pressure on either set of brakes being obtainable by operation of the lever 164.

The hoisting drums 53 and 65 may be operated while such pressure is applied to the brakes 161, as may be necessary to hold the drum or drums not being driven against rotation due to the gravity pull of the load on a drum cable, but not great enough to prevent the driving of either drum by its hydraulic motor. Also by manipulating the pressure applied to the drum brakes one drum may be operated to wind up its cable while the other is permitted to be rotated in an unwinding direction under the control of its brake.

It is to be understood that variations and modifications of the specific device herein shown and described for purposes of illustration, may

What I claim is:

1. A truck crane comprising a motor truck having a frame, a front axle rigidly attached to the frame, wheels at opposite ends of the front axle, swiveled wheels supporting the rear end of said frame, a steering mechanism connected to said swiveled wheels, an engine mounted on the rear end of said frame and geared to said front wheels, a boom-supporting frame having a pivot post at its front end journaled in said truck frame directly over said front axle centrally thereof, an arcuate transverse track fixed to the truck frame, wheels on the rear end of said boom supporting frame and resting on said track, an extensible boom pivoted to the front end of said supporting frame to swing vertically, a hoist cable running over said boom, a liquid reservoir, a pump on the truck frame driven by said engine, hydraulic motors on said boom-supporting frame for operating said cable and for hoisting said boom, a cylinder carried by the boom for extending the boom, and valve controlled connections from said pump to the cylinder and hydraulic motors.

2. A truck crane comprising a motor truck having a frame, a boom carrying frame pivoted at its forward end to said truck frame to turn about a vertical axis centrally of the truck frame adjacent its forward end, a boom pivoted to the forward end of said carrying frame adjacent said axis to swing vertically, boom and load hoist mechanisms including hydraulic motors mounted on said boom carrying frame, a vertically disposed header on the forward end of said boom carrying frame above the inner end of the boom and adjacent said vertical axis, a header on the forward end of the truck frame below the inner end of said boom, pipes on the boom carrying frame connecting each of said hydraulic motors to said vertical header, pipes on the truck frame connected to the truck frame header, a flexible conduit connecting a pipe on the truck frame to each of the pipes on the boom carrying frame through said headers, each of said flexible conduits being in front of the forward end of said carrying frame and extending past the inner end of the boom and being bowed laterally to clear the boom, and valve controlled means for directing fluid under pressure through said pipes to operate said motors.

ROY C. HOWELL.

REFERENCES CITED

The following references are of record in the file of this patent:

UNITED STATES PATENTS

| Number | Name | Date |
| --- | --- | --- |
| 323,924 | Evers | Aug. 11, 1885 |
| 435,179 | Hemphill et al. | Aug. 26, 1890 |
| 545,589 | Kilgore | Sept. 3, 1895 |
| 697,686 | Speer | Apr. 15, 1902 |
| 1,238,588 | Snook | Aug. 28, 1917 |
| 1,391,782 | McDannold | Sept. 27, 1921 |
| 1,411,298 | Osborn | Apr. 4, 1922 |
| 1,494,580 | Brandt | May 20, 1924 |
| 1,611,326 | Abbe | Dec. 21, 1926 |
| 1,662,902 | Russell | Mar. 20, 1928 |
| 1,755,738 | Klepadlo et al. | Apr. 22, 1930 |
| 1,861,194 | Sloane | May 31, 1932 |
| 1,941,952 | Nickles | Jan. 2, 1934 |
| 1,947,264 | Johnson et al. | Feb. 13, 1934 |
| 2,075,819 | Manly | Apr. 6, 1937 |
| 2,093,617 | Ormsby | Sept. 21, 1937 |
| 2,098,237 | Hailey | Nov. 9, 1937 |
| 2,175,196 | Keevil | Oct. 10, 1939 |
| 2,196,649 | Waite | Apr. 9, 1940 |
| 2,223,863 | Wunsch | Dec. 3, 1940 |
| 2,254,083 | Nickles et al. | Aug. 26, 1941 |
| 2,264,231 | Baker et al. | Nov. 25, 1941 |
| 2,313,084 | Manly | Mar. 9, 1943 |
| 2,323,493 | Sloane | July 6, 1943 |
| 2,328,606 | Boldt | Sept. 7, 1943 |
| 2,383,426 | Tanenbaum | Aug. 21, 1945 |
| 2,387,087 | Nelson | Oct. 16, 1945 |

FOREIGN PATENTS

| Number | Country | Date |
| --- | --- | --- |
| 391,777 | Great Britain | Apr. 26, 1933 |